(12) United States Patent
Tsui et al.

(10) Patent No.: US 7,136,009 B1
(45) Date of Patent: Nov. 14, 2006

(54) DIGITAL CUEING RECEIVER

(75) Inventors: James B. Y. Tsui, Dayton, OH (US); Stephen L. Hary, Dayton, OH (US); David M. Lin, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 791 days.

(21) Appl. No.: 10/354,266

(22) Filed: Jan. 31, 2003

(51) Int. Cl.
*G01S 7/40* (2006.01)
(52) U.S. Cl. .................... 342/13; 342/195; 342/196
(58) Field of Classification Search ............... 342/13, 342/195, 196
See application file for complete search history.

(56) References Cited

U.S. PATENT DOCUMENTS

| 4,301,454 A | 11/1981 | Bailey |
| 4,644,267 A | 2/1987 | Tsui et al. |
| 4,699,466 A | 10/1987 | Brandstetter et al. |
| 4,922,256 A | 5/1990 | Brandstetter |
| 6,448,921 B1 * | 9/2002 | Tsui et al. ............... 342/13 |
| 6,690,315 B1 * | 2/2004 | Schamus et al. .......... 342/13 |
| H2109 H * | 9/2004 | Tsui et al. ............... 342/196 |
| 6,972,708 B1 * | 12/2005 | Tsui et al. ............... 342/13 |

* cited by examiner

*Primary Examiner*—Dan Pihulic
(74) *Attorney, Agent, or Firm*—AFMCLO/JAZ; Gerald B. Hollins

(57) ABSTRACT

A digital cueing radio receiver system embodied using digital memory in lieu of analog delay lines and thereby avoiding delay line implementation difficulties. The cueing receiver system includes a wideband receiver portion providing an output signal employed for tuning a narrowband receiver portion of the system. Signal delay enabling use of the wideband receiver portion output signals for tuning the narrow band receiver portion selection frequency is provided by a digital memory circuit operating on analog-to-digital converted samples of input signal data of the receiver system. Approximated unity value related mathematical multiplication free Kernel function values are employed in the Fourier transformation. Avoidance of analog delay line-elements in embodying the system is a significant practical advantage of the invention.

19 Claims, 3 Drawing Sheets

DIGITAL CUEING RECEIVER

RIGHTS OF THE GOVERNMENT

The invention described herein may be manufactured and used by or for the Government of the United States for all governmental purposes without the payment of any royalty.

BACKGROUND OF THE INVENTION

Cueing radio receiver receivers are used to control the frequency selection in a second radio receiver in a number of electronic applications, including military electronic warfare systems. As shown in certain of the prior patents identified in connection with the present document, these uses also include signal recorders, signal analyzers and signal processing systems of plural types. Heretofore such cueing receivers have been realized in analog signal processing form and have thus encountered implementation difficulty, size, cost and complexity sufficient to suggest sparing use of such receivers. Additional background information regarding the cueing receiver and its applications may be found in a textbook authored by one of the inventors named in the present patent document i.e., in the text "Microwave Receivers With Electronic Warfare Applications" authored by James Bao-yen Tsui, John Wiley and Sons, 1986, see especially the material starting on page 385 of this text. The present invention is believed to offer a viable alternative to at least part of the difficulties attending previous analog cueing receivers and their implementation.

SUMMARY OF THE INVENTION

The present invention provides a simple low cost and low complexity digital arrangement of a cueing radio receiver.

It is an object of the invention to provide an improved digital cueing receiver usable as a part of an electronic warfare system.

It is another object of the invention to provide a cueing receiver in which digital signal processing is used.

It is another object of the invention to provide a digital cueing receiver based on use of the monobit frequency identification radio receiver.

It is another object of the invention to provide a digital cueing receiver incorporating approximated Kernel function values near unity magnitude in an included Fourier transformation operation.

It is another object of the invention to provide a cueing receiver in which the frequently encountered analog delay line element is omitted.

It is another object of the invention to provide a cueing receiver in which a digital memory is used to enable omission of the previously difficult to implement analog delay line.

These and other objects of the invention will become apparent as the description of the representative embodiments proceeds.

These and other objects of the invention are achieved by the digital cueing receiver method of determining selected salient characteristics of a microwave frequency analog input signal, said method comprising the steps of:

generating digital words representing successive word segments of said microwave frequency analog input signal;

storing a succession of said digital words in a temporary storage digital memory;

transforming each input signal-determined digital word into a Fourier transformation, frequency domain signal representation using a unity magnitude related Kernel function approximation algorithm of a wide bandwidth first radio receiver;

said Fourier transformation frequency domain signal representation including a plurality of analog input signal-determined frequency components;

tuning a narrow bandwidth second radio receiver to frequencies represented in said plurality of analog input signal-determined frequency components; and determining from signal amplitudes at each tuned frequency represented in said plurality of analog input signal-determined frequency components said selected salient characteristics of said microwave frequency analog input signal.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

Figure 1:
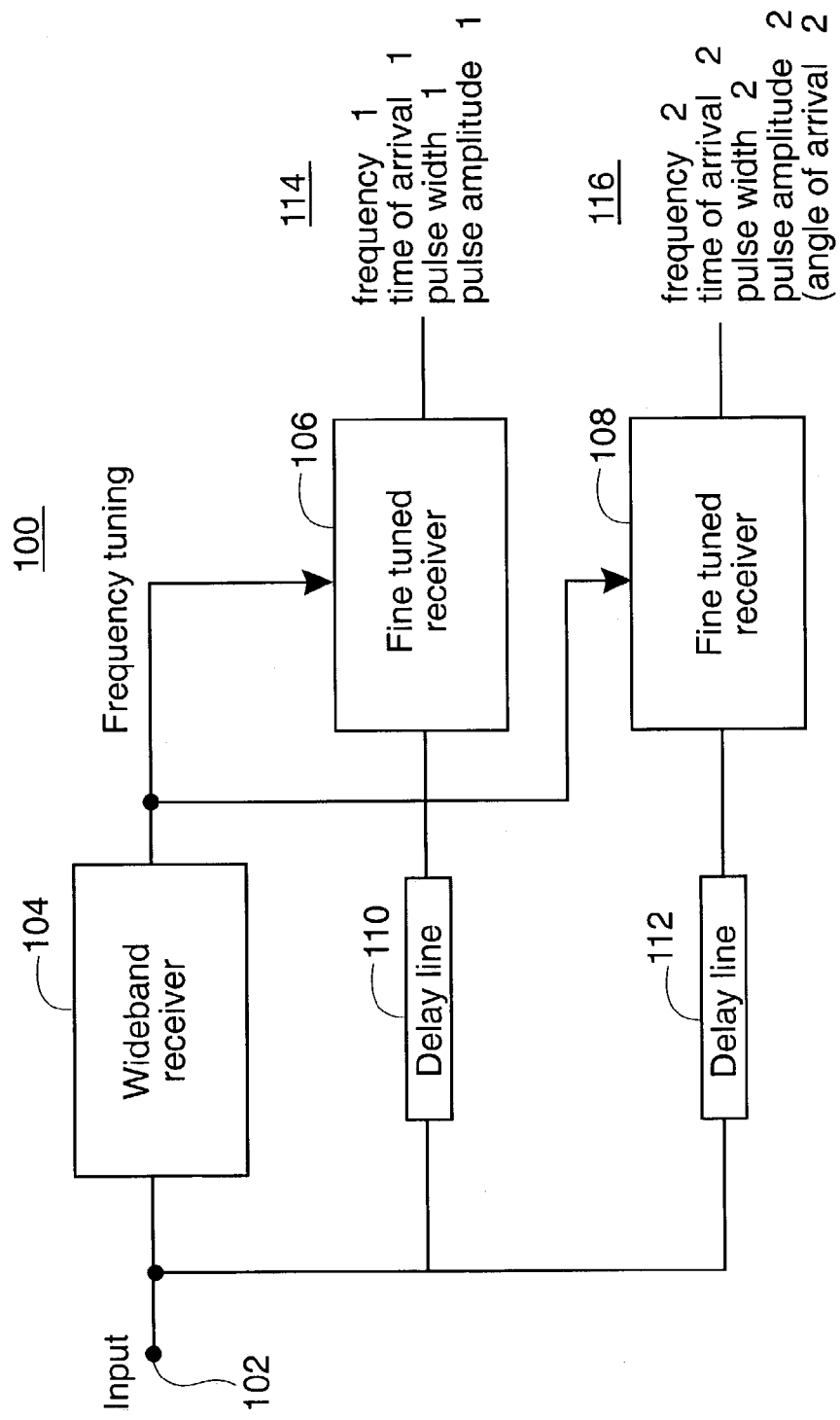
FIG. 1 shows a prior art analog cueing receiver system.

FIG. 1 in the drawings shows the general principles of a present-day analog cueing receiver system 100. In the FIG. 1 apparatus input signals located within a wide band portion of the electromagnetic spectrum, usually at microwave frequencies, arrive at the node 102 from a receiving antenna and are applied to the input port of a wideband receiver circuit 104 and also propagated toward two narrowband receiver circuits 106 and 108. The input signals at 102 are first processed by the receiver circuit 104, which may be of the channelized receiver type or be another type of receiver having a wide instantaneous bandwidth capability and the ability to identify the frequency of each of multiple input signal component.

The frequency information determined by the wideband receiver circuit 104 is used to tune one or more fine-tuned receiver circuits such as those shown at 106 and 108 in order to obtain more detailed additional information about the individual input signal(s) received at node 102. This additional information may include such signal characteristics as a fine frequency measurement, a modulation pulse width (PW) determination, a modulation pulse amplitude (PA) measurement and time of arrival (TOA) data for each signal and each signal component received at node 102. As is implied by this statement, it is contemplated that both the presence of a single source input signal having a plurality of different signal components and multiple signal sources also possibly of plural component composition are within the capability of the cueing receivers considered herein. If the two receiver circuits 106 and 108 are arranged to receive signals from physically displaced separate antennas, the angle of arrival (AOA) of a particular input signal can also be measured by comparing the time of arrival information from each receiver circuit. The array of possible output signals from the illustrated analog cueing receiver system 100 are shown at 114 and 116 in the FIG. 1 drawing. The angle of arrival output signal is listed in association with the second receiver 108 in FIG. 1 in recognition of the condition that first and second time of arrival signals are needed in determining angle of arrival data.

In fabricating the usual analog cueing receiver system, such as that shown in FIG. 1, analog delay lines as are represented at 110 and 112 are needed. During the time the wideband receiver circuit 104 processes the input signals from node 102, the delay lines 110 and 112 are used to store or delay the signals applied to the fine tuned receiver circuits 106 and 108 in order to provide time for these receiver circuits to be tuned to the frequencies of the individual input signals or the signal components being received at node 102. When the delayed input signal arrives at each narrowband receiver circuit, it can then be properly processed to obtain the desired additional signal related information. For this reason the output data shown at 114 and 116 for the FIG. 1 system becomes available some finite time after the appearance of signals at the node 102.

In the real world of electronic system fabrication, however, it is difficult to build a wideband delay line having low insertion loss characteristics. This difficulty may be appreciated by considering that the signals of interest at node 102 in the FIG. 1 system may be located over wide portions of the gigahertz region in the electromagnetic spectrum and the delays needed for processing these signals in the wideband receiver circuit 104 may be in the order of a microsecond of time. In addition to these operating environment requirements, it is necessary for the delay lines at 110 and 112 to maintain sufficient signal fidelity or to introduce only such little signal degradation as to enable determination of the signal characteristics listed at 114 and 116. Physical size considerations as well as physical damage susceptibility and cost considerations also affect the desirability of delay line inclusive systems.

In fact when the delay interval of about 1 microsecond is needed in the FIG. 1 system, delay lines 110 and 112 are sufficiently long as to usually preclude satisfactory use of the coiled transmission line embodiments of a delay line, but sufficiently short as to preclude satisfactory use of the acoustic signal forms of a delay line (because of the close placement of transducers along the acoustic media this delay involves). As a result of these delay line difficulties, the approach of the FIG. 1 cueing receiver system is additionally not popular with system designers.

A digital cueing receiver can, however, be built without the use of analog delay lines. This concept is shown in a first form by the digital cueing receiver system represented at 200 in the FIG. 2 drawing herein. In the receiver system 200 the input signals from node 202 can be digitized by what is today considered a high performance analog-to-digital converter (ADC) as is represented at 204 in FIG. 2 and the resulting digitized data then stored in memory as is represented at 206. Past history in the electronics art suggests today's high performance analog-to-digital converter will be routinely used in a relatively short time. A major benefit achieved with the FIG. 2 digital cueing receiver system is the ability to avoid use of the delay lines shown at 110 and 112 in the FIG. 1 system.

Figure 2:
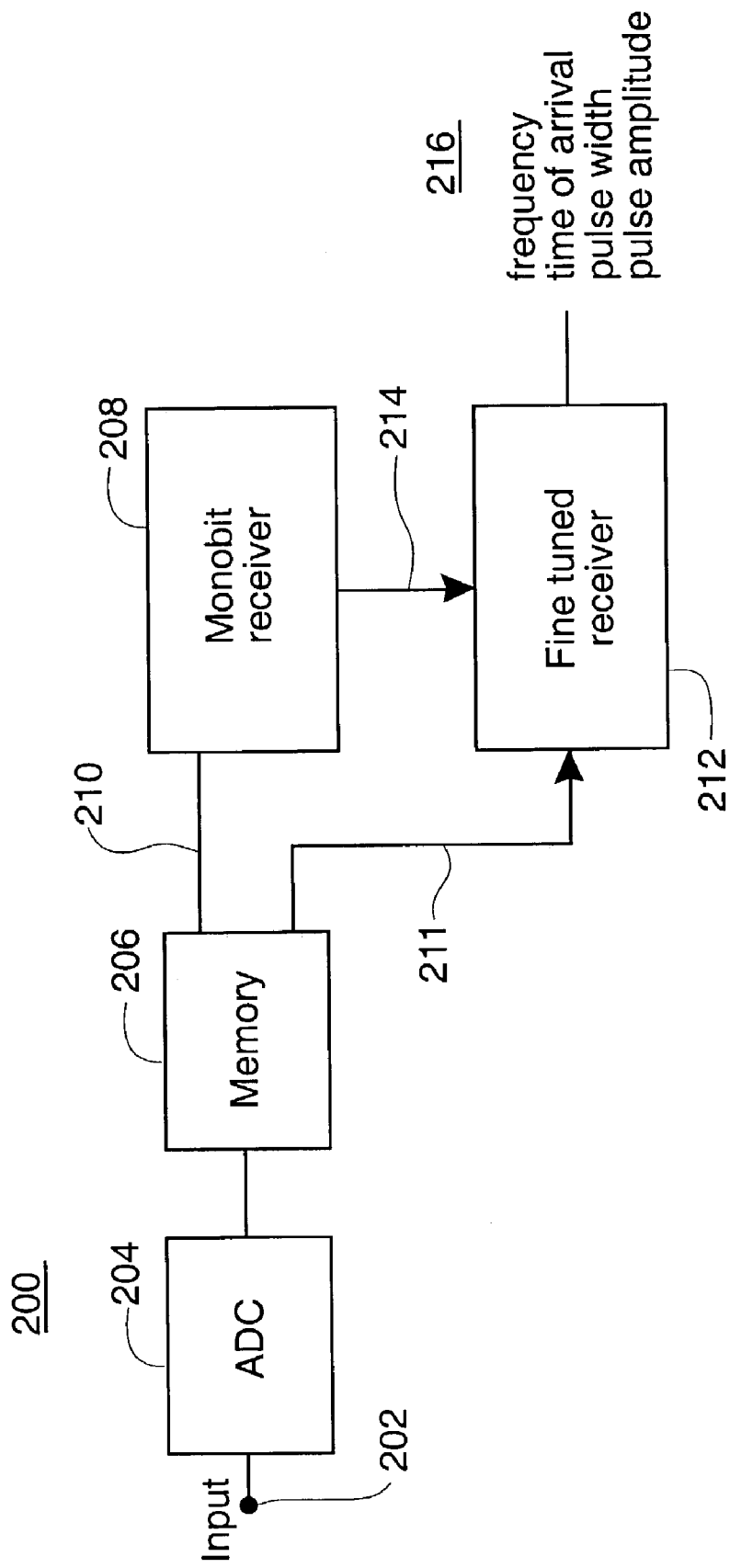
FIG. 2 shows a first arrangement of a digital cueing receiver system according to the present invention.

The digitized input signal data stored in the FIG. 2 memory 206 can be processed to obtain individual signal data for use in tuning the fine tuned receiver circuit 212 by a simplified radio receiver circuit of the type we have disclosed in a series of previously filed, now issued and yet pending U.S. Patent applications. This receiver circuit is known generically by the name of a "monobit receiver" circuit and may occupy the block represented at 208 in the FIG. 2 drawing. The monobit receiver is a simple receiver based on the concept of approximating the Fourier transformation involved in a frequency identification receiver using easily mechanized, often unit magnitude, Kernel function approximation values. The monobit receiver can detect multiple simultaneously received input signals. Additional details concerning the approximated Kernel function monobit receiver follow.

More precisely, Fourier transformation Kernel functions of unit magnitude or substantially unit magnitude may be used in a monobit receiver to successfully approximate a true Kernel function value and by so doing enable the realization of the Fourier transformation using only multiplication by unity or in essence no multiplication in the Fourier transformation computation algorithm. Kernel function realization in this manner is first disclosed in a now issued U.S. Patent of Tsui et al., numbered U.S. Pat. No. 5,917,737, a patent wherein Kernel function values are located on a circle of unit radius at angular locations of $\pi/4$, $3\pi/4$, $5\pi/4$ and $7\pi/4$ radians i.e., at locations displaced by forty-five degrees from the real and imaginary axes of a coordinate axis plot. In other words, actual coordinate axis locations of $1+j$, $1-j$, $-1+j$ and $-1+j$ (i.e., 1j) are used for the Kernel function disclosed in the U.S. Pat. No. 5,917,737 patent. The Kernel function of the '737 patent is therefore truly of a monobit nature in that it involves magnitudes of one and zero and hence may be represented by a single binary bit of data. Later improvements to this truly monobit approximation, even though departing somewhat from a truly monobit nature, have continued to be referred to using the monobit name and this practice is also continued in the present document.

The U.S. Pat. No. 5,793,323 also involves inventor Tsui and relates to the U.S. Pat. No. 5,917,737 patent in that it discloses an integrated circuit chip arrangement for a monobit receiver employing the approximated Kernel function of the U.S. Pat. No. 5,917,737 patent. This patent also discloses several implementation compromises possible in applying the simplified Kernel function to receiver apparatus. The U.S. patent application Ser. No. 09/917,589 now U.S. Pat. No. 6,448,921 filed on Jul. 30, 2001 also involves inventor Tsui and also relates to the U.S. Pat. No. 5,917,737 patent, in that it discloses the use of a monobit receiver in combination with several bandpass filters in order to increase the number of simultaneously processable signals and enhance the dynamic range capability of the overall system.

The invention of U.S. patent application Ser. No. 09/944,616 now abandoned, filed on Sep. 4, 2001, also involves inventor Tsui and provides a straightforward approach to the enhancement of dynamic range in a monobit receiver by increasing the number of Kernel function locations used in the Kernel function approximation from the four locations of the U.S. Pat. No. 5,917,737 patent and the U.S. Pat. No. 5,963,164 patent to eight locations. In application Ser. No. 09/944,616 now abandoned, Kernel function values located at the $\pi/4$, $3\pi/4$, $5\pi/4$ and $7\pi/4$ radian locations are added to the Kernel function values at 0, $\pi/2$, $\pi$, and $3\pi/2$ radians, with the added four values being slightly increased in magnitude from true unit circle values and in fact having a magnitude of $(2)^{1/2}$ or 1.414. Some of these eight location Kernel function values depart slightly from unity magnitude, however, the overall results of the eight-location Kernel function appear favorable.

The invention of U.S. patent application Ser. No. 10/008,476, filed on Dec. 10, 2001, also involves inventor Tsui and also relates to the monobit receiver family in that it discloses the combination of a monobit receiver with a channelizing digital filter bank and uses an eight point Kernel function approximation of the type disclosed in the Ser. No. 09/944, 616 application in order to separate simultaneous signals appearing in one digital filter channel.

The invention of U.S. patent application Ser. No. 10/115,819 now U.S. Statutory Invention Registration H002109 filed on Apr. 3, 2002 also involves inventor Tsui and also relates to the monobit receiver family in that it discloses a receiver from the monobit family applied to a signal source locating or direction finding usage. The eight point Kernel function approximation of the type disclosed in the Ser. No. 09/944,616 application is also used in the invention of this Ser. No. 10/115,819 application.

The invention of U.S. patent application Ser. No. 10/354,267 now U.S. Pat. No. 6,690,315 filed on Jan. 31, 2003 also involves inventor Tsui and also relates to the monobit receiver family in that it discloses a quadrabit approximation of the Fourier transformation Kernel function. This quadrabit Kernel function provides what appears to be an optimum compromise with respect to monobit receiver dynamic range and achieved degree of simplification of the Kernel function approximation.

In considering patents of interest with respect to the present invention, the U.S. Pat. No. 4,301,454 of D. E. Bailey also is considered deserving of identification since it discloses the combination of a wide band receiver used to control the frequency selection of a narrow band receiver as appears in the FIG. 1 drawing discussed above. Each of the patents, patent applications, textbooks and other references identified herein is hereby incorporated by reference into the present document.

A significant consideration in the monobit family of receivers identified in the above discussion is that the instantaneous dynamic range achieved in the receiver is undesirably low. The instantaneous dynamic range relates to the receiver's capability to detect two simultaneous signals of different amplitude. Because of the non-linear properties of the Kernel function in general and especially the approximated Kernel function in the original Tsui et al. U.S. Pat. No. 5,917,737 patent receiver, the instantaneous dynamic range of this receiver is limited to about 5 dB. Using a different Kernel function in the later tribit receiver of the Ser. No. 09/944,616 now abandoned application can improve this instantaneous dynamic range to about 10 dB and the later AFD 579 quadrabit Kernel function approximation application provides what is believed to be an optimum dynamic range of 15 db.

Since the dynamic range experienced with the monobit receiver family is somewhat low, it follows that for the FIG. 2 present invention purposes the input digital data required to the receiver circuit 208 can be limited to a relatively few number bits in order to simplify systems assembled according to the present invention. For example, the analog-to-digital converter 204 in FIG. 2 may have an 8-bit capability and operate at a frequency of 3 GHz, however, a monobit type receiver used at 208 can only require 4 or 5 bits of input data because of the limited bits of the Kernel function. In order to simplify the FIG. 2 system therefore the stored data from memory 206 may be compressed into 4 or 5 bits for use in receiver circuit 208. Such data compression will also decrease the dynamic range of the FIG. 2 system, however, since the receiver 208 is only required to measure frequencies included in the input signal, this compression does not create severe performance degradation.

The memory 206 serves in the FIG. 2 system to delay the signals received at the fine tuned receiver 212 until the tuning of this receiver to an appropriate frequency for the received input signal or signal component under consideration can be accomplished. The delay needed to permit this tuning is on the order of one microsecond according to the present state of the electronic art. One memory arrangement for achieving such delay includes disposing the memory 206 in the form of a parallel bits shift register in which successive samples of the data from ADC 204 are stored in amplitude coded form as words disposed across the shift register successive parallel bits. Successive words in the shift register are then examined by Fourier transformation in the monobit receiver located at 208 using a Fourier transformation rate and a shift register clock out rate of, for example, 102.4 nanoseconds per word. Data received from the ADC 204 may be shifted into the memory 206 shift register at a rate of about 2.5 gigahertz, also a suitable output rate for the ADC 204. According to the usual practice with shift register disposed memories new data flows into one end of the shift register memory and old data overflows as a succession of parallel bits from the opposite register end.

The fine tuned receiver 212 in FIG. 2 can be embodied in the form of a simple processing algorithm. For example, this receiver can determine one frequency component X(k) coefficient of a discrete Fourier transform (DFT) as $$X(k) = \sum_{n=0}^{N-1} w(n)x(n)e^{-\frac{j2\pi kn}{N}} \tag{1}$$

where w(n) is a weighting function, x(n) is the input and N is length of the DFT. The value of k is determined by the cueing receiver system and need not be an integer. This can provide better frequency resolution. If two adjacent X(k) frequencies are found to be present in the input signal at 202, the fine frequency for receiver 212 can be calculated from an amplitude comparison of the two frequency-related outputs. Alternately the phase relationship from equation (1) can be used to find a fine frequency.

The input data to the fine tuned receiver 212, the data along path 211 in FIG. 2, is not compressed and includes all of the bits available. (The amplitude and all the input data information are preferably retained in the stored input data communicated along path 211.) Thus, the output from the fine tuned receiver contains all the information available concerning a received signal.

Since the one component FFT embodied into the monobit receiver 208 in the FIG. 2 cueing receiver system is simple, the FFT portion of the FIG. 2 system may be embodied in the form of either software or hardware.

Two fine tuned receivers are shown in the FIG. 1 drawing herein. In FIG. 2 these two receivers are reduced to the single receiver 212. In reality the number of fine tuned receivers can be any number desired, depending on the number of simultaneous signals to be processed. If the receiver 212 is achieved through software implementation, the hardware required for the FIG. 2 system is relatively simple.

Figure 3:
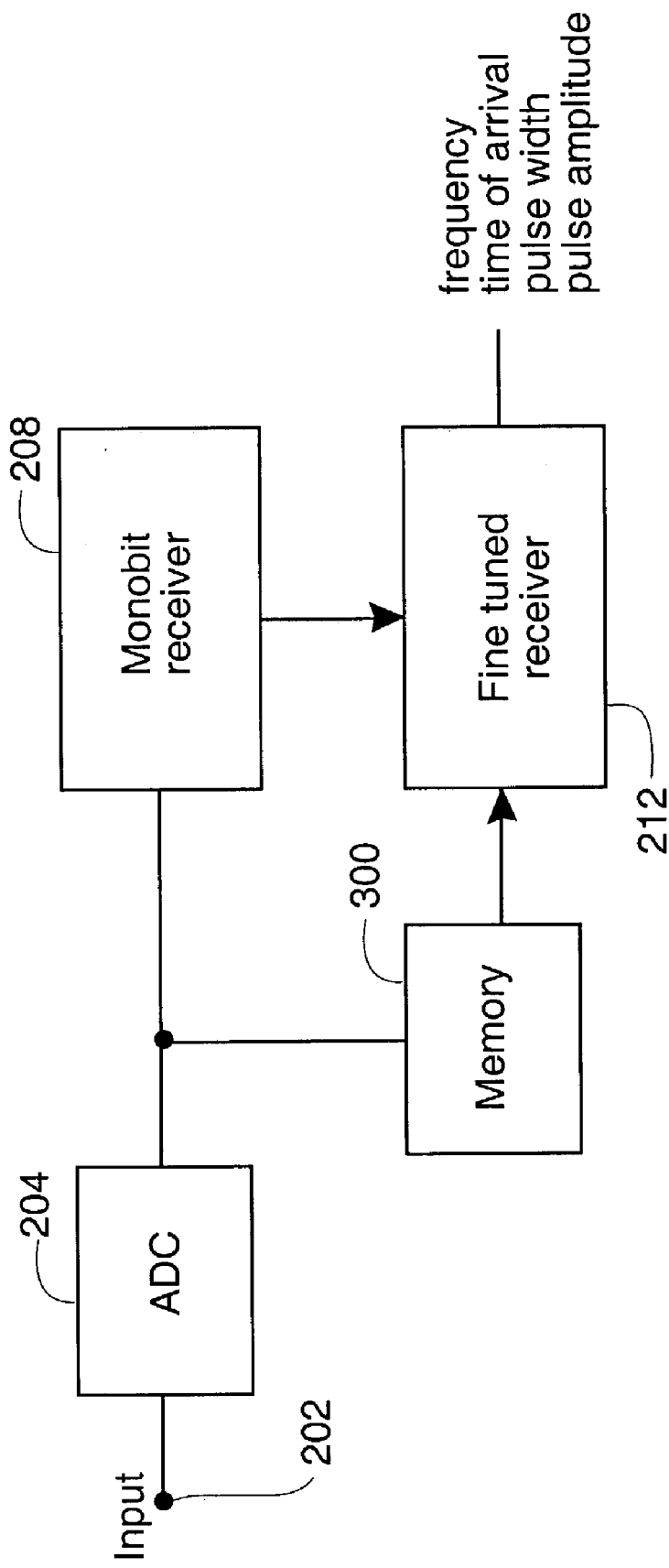
FIG. 3 shows a second arrangement of a digital cueing receiver system according to the present invention.

FIG. 3 in the drawings shows an alternate arrangement of the present invention. In the FIG. 3 cueing receiver system the output of the ADC 204 is applied directly to the monobit receiver located at 208 rather than being stored in memory as is illustrated in the FIG. 2 system. The memory 300 in the FIG. 3 system is also used to store data representing the digitized input from port 202 until the narrowband receiver at 212 has been tuned appropriately in response to the output of the monobit receiver at 208. The application of digitized input signal data directly to the monobit receiver as shown in the FIG. 3 system has the advantage of eliminating the delay associated with buffering the digital signal in memory 206 for input to the monobit receiver 208 in the FIG. 2 system. In addition to this advantage, the FIG. 3 arrangement of the present invention provides improvement in the area of size and complexity of the memory.

A monobit type of receiver used in the present invention can therefore measure the frequencies included in an input signal and then can be used to cue a fine tuned receiver without use of delay line elements as have been necessary in previous systems. Such a cueing receiver can be very simple and of low power and low cost. A digital memory can thus be used to replace the analog delay lines in an analog cueing receiver. While the monobit type receiver processes the input signal, the memory stores the data for further processing by a fine tuned receiver. The memory does not have the problems associated with the analog delay lines.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. Digital cueing radio receiver apparatus comprising the combination of:
    an analog-to-digital converter circuit having an input port connected to a source of microwave frequency analog signals;
    a digital memory circuit connected with an output signal of said analog-to-digital converter circuit and having data storage capacity for a selected interval of digital converted microwave frequency analog signal input data words;
    a wideband monobit radio receiver connected with an output port of said digital memory circuit and including an embodied input frequency identification Fourier transformation algorithm having a selected limited number of unit magnitude-related approximated Kernel function values; and
    a narrowband fine tuned radio receiver having a signal input port connected with an output port of said digital memory circuit and a tuning frequency control input connected with an output signal of said wideband monobit radio receiver;
    said narrowband fine tuned receiver generating at least one of a frequency identification output signal, an input signal time of arrival identification output signal, an input signal pulse width identification output signal and an input signal pulse amplitude identification output signal.

2. The digital cueing receiver apparatus of claim 1 wherein said microwave frequency analog signals include a carrier and a carrier modulation component.

3. The digital cueing receiver apparatus of claim 2 wherein said microwave frequency analog signals include a pulsed modulation component.

4. The digital cueing receiver apparatus of claim 1 wherein said wideband monobit radio receiver connected with an output port of said digital memory circuit and including an embodied input frequency identification Fourier transformation algorithm include one of Kernel function value sets of $\pm 1 \pm j$, $\pm 2^{1/2} \pm j2^{1/2}$.

5. The digital cueing receiver apparatus of claim 1 wherein said narrowband fine tuned radio receiver tuning frequency control input and said digital memory circuit have equal time response characteristics.

6. The digital cueing receiver apparatus of claim 1 wherein said source of microwave frequency analog signals is comprised of a radio frequency signal antenna.

7. The digital cueing receiver apparatus of claim 1 wherein said analog-to-digital converter circuit, said digital memory circuit, said wideband monobit radio receiver and said narrowband fine tuned radio receiver comprise a first cueing receiver assembly and further including:
    a second analog-to-digital converter circuit having an input port connected to a second source of microwave frequency analog signals;
    a second digital memory circuit connected with an output signal of said second analog-to-digital converter circuit and having data storage capacity for a selected interval of digital converted microwave frequency analog signal input data words;
    a second wideband monobit radio receiver connected with an output port of said second digital memory circuit and including an embodied input frequency identification Fourier transformation algorithm having a selected limited number of unit magnitude-related approximated Kernel function values; and
    a second narrowband fine tuned radio receiver having a signal input port connected with an output port of said second digital memory circuit and a tuning frequency control input connected with an output signal of said second wideband monobit radio receiver;
    said second narrowband fine tuned receiver generating at least one of a frequency identification output signal, an input signal time of arrival identification output signal, an input signal pulse width identification output signal and an input signal pulse amplitude identification output signal;
    said second analog-to-digital converter circuit, said second digital memory circuit, said second wideband monobit radio receiver and said second narrowband fine tuned radio receiver comprising a second cueing receiver assembly; and
    said first and second cueing receiver assemblies comprise an angle of arrival determination system.

8. The digital cueing receiver apparatus of claim 1 wherein said digital memory circuit selected interval of digital converted microwave frequency analog signal input data words comprises one kilobyte.

9. The digital cueing receiver apparatus of claim 1 wherein said a digital memory circuit is configured as a parallel bits shift register.

10. The digital cueing receiver method of determining selected salient characteristics of a microwave frequency analog input signal, said method comprising the steps of:
    generating digital words representing successive word segments of said microwave frequency analog input signal;
    storing a succession of said digital words in a temporary storage digital memory;
    transforming each input signal-determined digital word into a Fourier transformation, frequency domain signal representation using a unity magnitude related Kernel function approximation algorithm of a wide bandwidth first radio receiver;
    said Fourier transformation frequency domain signal representation including a plurality of analog input signal-determined frequency components;
    tuning a narrow bandwidth second radio receiver to frequencies represented in said plurality of analog input signal-determined frequency components; and determining from signal amplitudes at each tuned frequency represented in said plurality of analog input signal-determined frequency components said selected salient characteristics of said microwave frequency analog input signal.

11. The digital cueing receiver method of determining selected salient characteristics of a microwave frequency analog input signal of claim 10 wherein said step of generating digital words representing successive word segments of said microwave frequency analog input signal includes processing said microwave frequency analog input signal using an analog-to-digital converter circuit.

12. The digital cueing receiver method of determining selected salient characteristics of a microwave frequency analog input signal of claim 10 wherein said step of storing a succession of said digital words in a temporary storage digital memory includes storing each successive digital word for a time duration enabling accomplishing of said step of tuning a narrow bandwidth second radio receiver to a selected frequency.

13. The digital cueing receiver method of determining selected salient characteristics of a microwave frequency analog input signal of claim 10 wherein said unity magnitude related Kernel function approximation algorithm of a wide bandwidth first radio receiver includes Kernel function magnitudes of $\pm 1 \pm j$.

14. The digital cueing receiver method of determining selected salient characteristics of a microwave frequency analog input signal of claim 10 wherein said step of tuning a narrow bandwidth second radio receiver to each frequency represented in said plurality of analog input signal-determined frequency components comprises tuning said second radio receiver in a time sequenced plurality of differing radio frequency settings.

15. The digital cueing receiver method of determining selected salient characteristics of a microwave frequency analog input signal of claim 10 wherein said step of determining from signal amplitudes at each frequency represented in said plurality of analog input signal-determined frequency components said selected salient characteristics of said microwave frequency analog input signal includes measuring analog input signal determined frequency components characteristics relating to one of analog input signal frequency, analog input signal time of arrival, analog input signal pulse width and analog input signal pulse amplitude.

16. The method of analyzing an analog input signal comprising the steps of:
tuning a fine tuned narrow band radio receiver to successive signal component frequencies of said analog input signal;
measuring selected characteristics of said analog input signal at each of said fine tuned narrow band radio receiver accessed signal component frequencies; and
identifying, using a mathematical multiplication-free Fourier transformation algorithm operating on digitally stored samples of said analog input signal, each of said successive analog input signal component frequencies to be accessed by said fine tuned narrow band radio receiver.

17. The method of analyzing an analog input signal of claim 16 wherein said step of measuring selected characteristics of said analog input signal at each of said fine tuned narrow band radio receiver accessed signal component frequencies comprises measuring said selected characteristics in said digitally stored samples of said analog input signal.

18. The method of analyzing an analog input signal of claim 16 wherein said stop of identifying, using a mathematical multiplication-free Fourier transformation algorithm operating on digitally stored samples of said analog input signal, each of said successive analog input signal component frequencies to be accessed by said fine tuned narrow band radio receiver comprises performing a unit value Kernel function approximation Fourier transformation on said digitally stored samples of said analog input signal.

19. The method of analyzing an analog input signal of claim 16 wherein said steps are executed in a substantially parallel manner on two substantially simultaneously received samples of said analog input signal to determine an angle of arrival characteristic of said analog input signal.

\* \* \* \* \*